United States Patent
Curtiss et al.

(10) Patent No.: US 9,077,419 B2
(45) Date of Patent: Jul. 7, 2015

(54) DEVICES, METHODS, AND SYSTEMS FOR INITIAL SIGNAL ACQUISITION

(71) Applicant: QUALCOMM Incorporated, San Diego, CA (US)

(72) Inventors: Troy Russell Curtiss, Boulder, CO (US); Vamsee Krishna Somavarapu, Boulder, CO (US); Gregory Robert Lie, San Diego, CA (US); Jun Hu, San Diego, CA (US); Alexey Semjonovs, Longmont, CO (US); Sundararaman Kunchithapatham, Superior, CO (US); Stanley Suyi Tsai, Frederick, CO (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/066,585

(22) Filed: Oct. 29, 2013

(65) Prior Publication Data

US 2014/0329483 A1 Nov. 6, 2014

Related U.S. Application Data

(60) Provisional application No. 61/818,872, filed on May 2, 2013.

(51) Int. Cl.
*H04B 7/08* (2006.01)
*H04B 1/18* (2006.01)

(52) U.S. Cl.
CPC .............. *H04B 7/0814* (2013.01); *H04B 1/18* (2013.01); *H04B 7/0871* (2013.01); *H04B 7/0877* (2013.01)

(58) Field of Classification Search
USPC .............. 455/132, 133, 134, 137, 272, 277.1, 455/277.2, 278.1
See application file for complete search history.

(56) References Cited

U.S. PATENT DOCUMENTS

| | | | |
|---|---|---|---|
| 2002/0164968 A1 * | 11/2002 | Crawford | 455/277.1 |
| 2005/0113048 A1 * | 5/2005 | Miyahara et al. | 455/137 |
| 2006/0166634 A1 * | 7/2006 | Ido | 455/277.1 |
| 2011/0136459 A1 * | 6/2011 | Min | 455/277.2 |
| 2013/0017797 A1 | 1/2013 | Ramasamy et al. | |
| 2013/0035051 A1 | 2/2013 | Mujtaba et al. | |
| 2013/0064151 A1 | 3/2013 | Mujtaba et al. | |
| 2013/0084807 A1 * | 4/2013 | Nukala et al. | 455/62 |
| 2013/0100885 A1 | 4/2013 | Ngai et al. | |

OTHER PUBLICATIONS

International Search Report and Written Opinion—PCT/US2014/021240—ISA/EPO—May 27, 2014.

* cited by examiner

*Primary Examiner* — Blane J Jackson
(74) *Attorney, Agent, or Firm* — Loza & Loza LLP

(57) ABSTRACT

Methods and apparatus for selecting one or more suitable antennas for use during power-up/initial acquisition and out of service modes are disclosed. In some examples, initial system acquisition may be performed for a particular receive circuit utilizing a selected one of a first antenna or a second antenna, based on a channel characteristic, such as an automatic gain control (AGC) value corresponding to a received signal energy utilizing either of the antennas. In another example, initial system acquisition utilizing either a receive diversity determination algorithm or an antenna switching determination algorithm may be performed based on a channel characteristic, such as an AGC value corresponding to a received signal energy utilizing one of the antennas coupled to one of the receive circuits.

20 Claims, 6 Drawing Sheets

DEVICES, METHODS, AND SYSTEMS FOR INITIAL SIGNAL ACQUISITION

CLAIM OF PRIORITY UNDER 35 U.S.C. 119

This application claims priority to and the benefit of U.S. Provisional Patent Application Ser. No. 61/818,872, filed May 2, 2013, titled "Devices, Methods, & Systems for Initial Signal Acquisition" incorporated herein by reference as if fully set forth below and for all applicable purposes.

TECHNICAL FIELD

The technology discussed below relates generally to communication systems, and more particularly to aspects and components functioning as part of a communication system. Some embodiments include devices, methods, and systems for enabling improved initial system acquisition in antenna switching scenarios for communication devices.

BACKGROUND

Wireless communications systems are widely deployed to provide various types of communication content such as voice, video, packet data, messaging, broadcast, and so on. These systems may be accessed by wireless devices of multiple users sharing the available system resources (e.g., time, frequency, and power).

Generally, a wireless device may be used to transmit and receive voice and/or data communications through the wireless communication systems. One commonly used technique to increase data rates and improve antenna performance is known as spatial diversity, wherein a wireless device uses multiple spatially separated antennas to simultaneously receive and/or transmit signals on multiple wireless communications channels. Often, data is sent from a wireless device using a single transmit circuit using a primary antenna that operates in duplex with a receive circuit that uses the primary antenna, and a second receive circuit, commonly referred to as a diversity receive circuit, that uses a secondary antenna. In cdma2000 1x terminology, such a scheme for receive diversity is referred to as Mobile Receive Diversity (MRD).

The use of multiple transmit and/or receive circuits is effective in enhancing user experience through higher data transmission rates. Moreover, signals received from each of the antennas can be combined with one another in such a way as to take advantage of the fact that the different position of each antenna means that it is relatively unlikely that each antenna would be in a deep fade at the same time. Thus, the probability of having reduced wireless performance due to moving into a location of a deep fade can be dramatically reduced.

For many devices today, when the wireless device initially powers up, or when the wireless device returns from being in a mode referred to as an out of service (OOS) mode, the wireless device may only use one receive circuit coupled to one antenna to attempt to acquire a system and establish communications with the cellular network. In wireless devices having more than one receive circuit, and configured to enable MRD, if each of the receive circuits is utilized to attempt to acquire the system, the probability of acquisition may be increased. However, there are certain costs to achieving the improved probability of acquisition, such as an increase in power consumption resulting from the use of an additional receive circuit(s), as well as possible increased latency in the acquisition. Thus, there remains a need to intelligently invoke MRD during system acquisition.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of initial system acquisition operable at a multi-antenna wireless communication device. Here, the method includes performing initial system acquisition utilizing a first antenna coupled to a first receive circuit if a first channel characteristic, detected utilizing the first antenna coupled to the first receive circuit (e.g., an automatic gain control (AGC) value corresponding to a received signal energy utilizing the first antenna coupled to the first receive circuit), is greater than a first threshold value. The method further includes toggling an antenna switching circuit to couple the first receive circuit to a second antenna if the first channel characteristic is not greater than the first threshold value. Finally, the method further includes performing initial system acquisition utilizing the second antenna coupled to the first receive circuit if a second channel characteristic, detected utilizing the second antenna coupled to the first receive circuit (e.g., an AGC value corresponding to a received signal energy utilizing the second antenna coupled to the first receive circuit), is greater than a second threshold value.

Another aspect of the disclosure provides a method of initial system acquisition operable at a multi-antenna wireless communication device. Here, the method includes performing initial system acquisition utilizing a first antenna coupled to a first receive circuit if a first channel characteristic detected utilizing the first antenna coupled to the first receive circuit (e.g., an automatic gain control (AGC) value corresponding to a received signal energy utilizing the first antenna coupled to the first receive circuit) is greater than a first threshold value. The method further includes selecting one of a receive diversity determination algorithm, or an antenna switching determining algorithm, for determining an antenna configuration for initial system acquisition if the first channel characteristic is not greater than the first threshold value.

Another aspect of the disclosure provides a wireless communication device, including at least one processor, a memory communicatively coupled to the at least one processor, a plurality of receive circuits communicatively coupled to the at least one processor, a plurality of antennas, and an antenna switching circuit communicatively coupled to the at least one processor for controlling a coupling between respective ones of the plurality of antennas and respective ones of the plurality of receive circuits. Here, the at least one processor is configured to perform initial system acquisition utilizing a first antenna of the plurality of antennas coupled to a first receive circuit of the plurality of receive circuits if a first channel characteristic, detected utilizing the first antenna coupled to the first receive circuit (e.g., an automatic gain control (AGC) value corresponding to a received signal energy utilizing the first antenna coupled to the first receive circuit), is greater than a first threshold value, to toggle the antenna switching circuit to couple the first receive circuit to a second antenna of the plurality of antennas if the first channel characteristic is not greater than the first threshold value, and to perform initial system acquisition utilizing the second antenna coupled to the first receive circuit if a second channel characteristic, detected utilizing the second antenna coupled to the first receive circuit (e.g., an AGC value corresponding to a received signal energy utilizing the second antenna coupled to the first receive circuit), is greater than a second threshold value.

Another aspect of the disclosure provides a wireless communication device including at least one processor, a memory communicatively coupled to the at least one processor, a plurality of receive circuits communicatively coupled to the at least one processor, a plurality of antennas, and an antenna switching circuit communicatively coupled to the at least one processor for controlling a coupling between respective ones of the plurality of antennas and respective ones of the plurality of receive circuits. Here, the at least one processor is configured to perform initial system acquisition utilizing a first antenna of the plurality of antennas coupled to a first receive circuit of the plurality of receive circuits if a first channel characteristic detected utilizing the first antenna coupled to the first receive circuit (e.g., an automatic gain control (AGC) value corresponding to a received signal energy utilizing the first antenna coupled to the first receive circuit) is greater than a first threshold value, and to select one of a receive diversity determination algorithm, or an antenna switching determining algorithm, for determining an antenna configuration for initial system acquisition if the first channel characteristic is not greater than the first threshold value.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
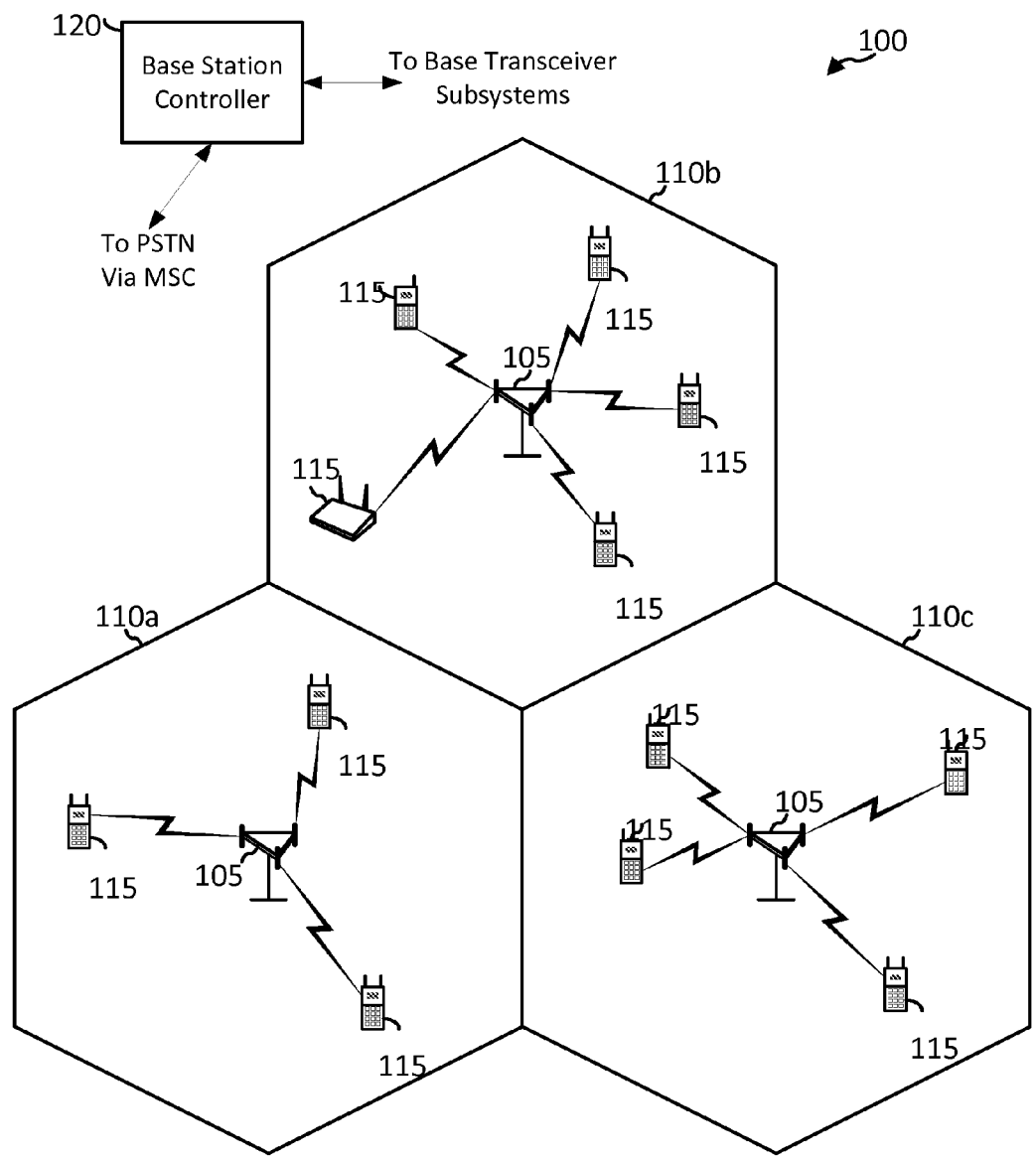
FIG. 1 is a block diagram of a wireless communications system in which various aspects of the disclosure may be implemented.

In the following description, reference is made to the accompanying drawings in which is shown, by way of illustration, specific approaches in which the disclosure may be practiced. The approaches are intended to describe aspects of the disclosure in sufficient detail to enable those skilled in the art to practice the invention. Other approaches may be utilized and changes may be made to the disclosed approaches without departing from the scope of the disclosure. The following detailed description is not to be taken in a limiting sense, and the scope of the disclosure is defined only by the appended claims.

Elements described herein may include multiple instances of the same element. These elements may be generically indicated by a numerical designator (e.g., "110") and specifically indicated by the numerical indicator followed by an alphabetic designator (e.g., "110A") or a numeric indicator proceeded by a "dash" (e.g., "110-1"). For ease of following the description, for the most part element number indicators begin with the number of the drawing on which the elements are introduced or most fully discussed.

The following description provides examples, and is not limiting of the scope, applicability, or configuration set forth in the claims. Changes may be made in the function and arrangement of elements discussed without departing from the spirit and scope of the disclosure. Various aspects may omit, substitute, or add various procedures or components as appropriate. For instance, the methods described may be performed in an order different from that described, and various steps may be added, omitted, or combined. Also, features described with respect to certain aspects may be combined in other aspects.

The discussions herein may involve CDMA and Evolution-Data Optimized (EV-DO) protocols and systems as one example in order to indicate additional details of some aspects of the disclosed approaches. Another example is a complementary device enhancement known as simultaneous (1×) Voice and (EV-DO) Data (SV-DO) that enables CDMA2000 devices to access EV-DO packet data services while in an active 1× circuit-switch voice call. However, those of ordinary skill in the art will recognize that various aspects of the disclosed approach may be used and included in many other wireless communication protocols and systems for selectively invoking mobile receive diversity (MRD) for acquisition. In particular, several different approaches for determining when to invoke MRD, in order to improve acquisition performance in marginal or weak coverage areas, are used.

FIG. 1 is a block diagram illustrating an example of a wireless communications system 100 configured according to one or more aspects of the disclosure. The system 100 includes base stations 105, wireless devices 115, a base station controller 120, and a core network (not illustrated; the controller 120 may be integrated into the core network). The system 100 may support operation on multiple carriers (waveform signals of different frequencies). Multi-carrier transmitters can transmit modulated signals simultaneously on the multiple carriers. Each modulated signal may utilize any suitable multiplexing or multiple access scheme, including but not limited to code division multiple access (CDMA), time division multiple access (TDMA), orthogonal frequency division multiple access (OFDMA), Single Carrier Frequency Division Multiple Access (SC-FDMA), etc. Each modulated signal may be sent on a different carrier and may carry control information (e.g., pilot signals), overhead information, data, etc.

The base stations 105 may wirelessly communicate with the wireless devices 115 via a base station antenna. The base stations 105 are configured to communicate with the wireless devices 115 under the control of the controller 120 via multiple carriers. Each of the base station 105 sites can provide communication coverage for a respective geographic area. The coverage area 110 for each base station 105 here is identified as 110-a, 110-b, or 110-c. The coverage area 110 for a base station 105 may be divided into sectors (not shown, but making up, for example, only a portion of the coverage area). The system 100 may include base stations 105 of different types (e.g., macro, micro, femto, and/or pico base stations).

The wireless devices 115 may be dispersed throughout the coverage areas 110. The wireless devices 115 may be referred to as wireless stations, mobile devices, access terminals (ATs), user equipment (UE) or subscriber units. The wireless devices 115 may include cellular phones and wireless communications devices, but may also include personal digital assistants (PDAs), other handheld devices, netbooks, notebook computers, televisions, entertainment devices, wearable devices, etc.

Different network scaling down modes can be considered depending on the network types and service goals. There are various ways of utilizing the channel and spatial resources in the network. Consider a wireless network that has multiple carriers over different sites. Different carriers can be used all for a single radio access technology (RAT) or multiple radio access technologies (multi-RAT) (e.g., N1 Universal Mobile Telecommunications System (UMTS) carriers and N2 Global System for Mobile Communications (GSM) carriers). Different modalities of scaling down the carrier and site dimensions may be defined.

Figure 2:
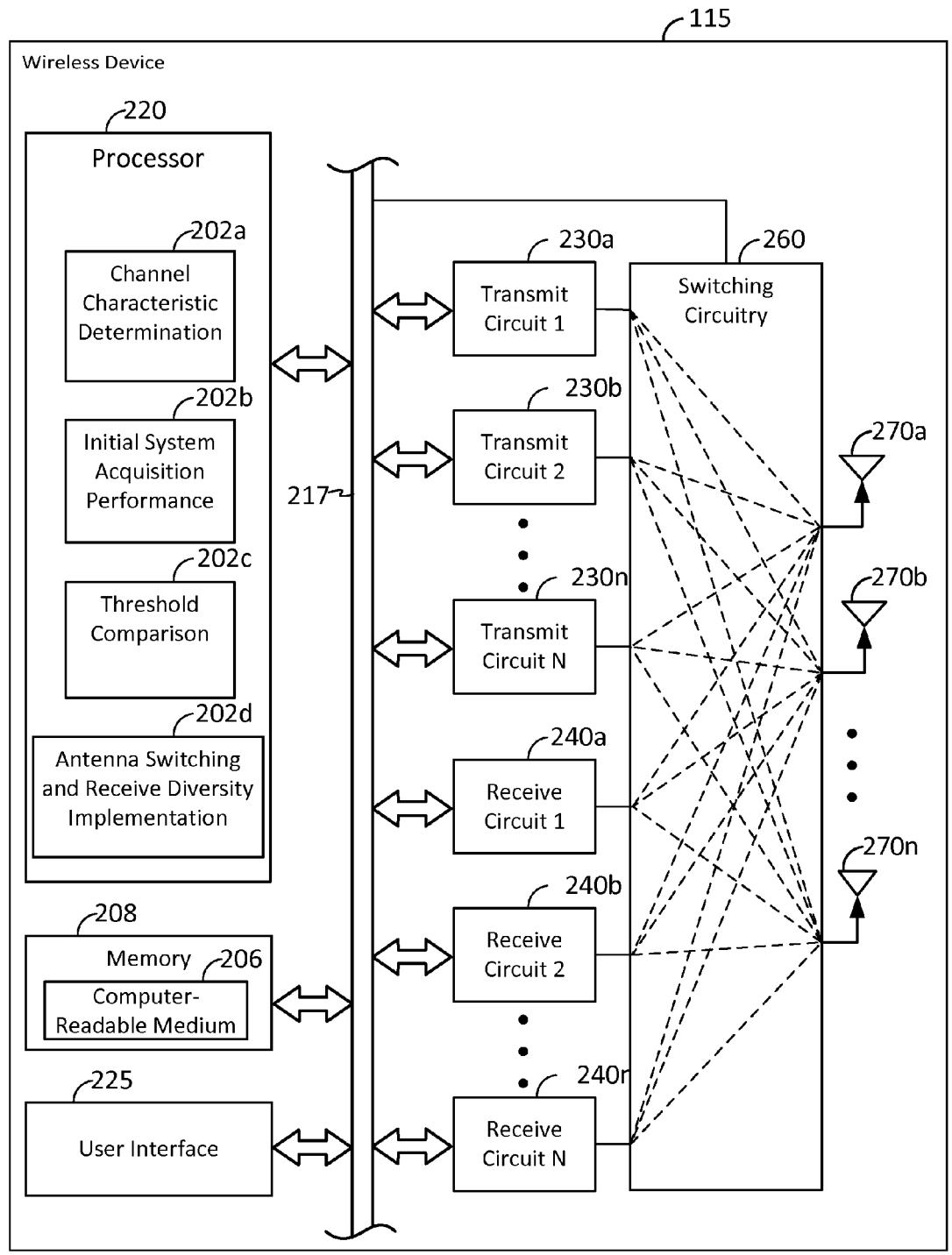
FIG. 2 is a block diagram of an exemplary wireless device configured in accordance with various aspects of the disclosed approach.

FIG. 2 is a block diagram illustrating an exemplary wireless device 115 configured according to one or more aspects of the disclosure. For example, the wireless device 115 may be an access terminal as illustrated in any one or more of FIG. 2 or 3. The wireless device 115 may have any number of different configurations, such as a personal computer (e.g., laptop computers, netbook computers, tablet computers, etc.), a cellular telephone, a PDA, a digital video recorder (DVR), an internet appliance, a gaming console, an e-reader, etc. The wireless device 115 may have a mobile configuration, having an internal power supply (not shown), such as a battery, to facilitate mobile operation.

The wireless device 115 includes two or more antennas 270a, 270b, . . . , 270n, which may be used in the transmission/reception of wireless communications to/from the wireless device 115. In some aspects of the disclosure, the antennas 270a-n may include a primary antenna and a secondary antenna, with the primary antenna used for transmission and reception of wireless communications on a wireless communications channel, and the secondary antenna used for reception of wireless communications on a different wireless communications channel. In some devices, wireless communications can be received on more than two wireless communications channels, with such devices including additional antennas as necessary to receive wireless communications on three or more different wireless communications channels.

The wireless device 115 may further include one or more transmit circuits, such as transmit circuits 230a, 230b, . . . , 230n, and one or more receive circuits, such as receive circuits 240a, 240b, . . . , 240n. Here, the transmit circuits 230a-230n and the receive circuits 240a-240n may be coupled to a plurality of antennas 270a, 270b, . . . , 270n by way of a switching circuitry 260. The receiver circuits 240a-n, according to some examples, receive signals from one or more of the antennas 270a-n, demodulate and process the signals, and provide the processed signals to a processor 220. The receiver circuits 240a-n may be receivers, receive chains, or any other suitable means for receiving.

That is, the receive circuits 240a-n may be configured to enable an enhanced mode for reception of data at the wireless device using mobile receive diversity (MRD) (sometimes referred to as receive diversity or R×D). Each of the receive circuits 240a-n includes components that are used in such receivers to perform such tasks as related to reception and filtering of incoming signals, frequency conversion and gain control, and baseband processing to provide a digital output to the processor 220.

Reference to several examples below will be made using two exemplary receive circuits, with the understanding that more than two receive circuits may be present in a wireless device 115, as illustrated in the exemplary wireless device 115 in FIG. 2, and that only two receive chains are described in various examples for a more simplified discussion and illustration of the concept.

Similarly, the transmitter circuits 230a-230n receive signals from the processor 220, process and modulate the signals, and transmit the processed and modulated signals using one or more of the antennas 270a-n. The transmitter circuits 230a-n may be transmitters, transmitter chains, or any other suitable means for transmitting. In some aspects of the disclosure, the transmitter circuits 230a-n and the receiver circuits 240a-n may be incorporated into a single transceiver circuit. The processor 220 performs processing tasks related to the operation of the wireless device 115, and is coupled to a user interface 225 that allows a user of the wireless device 115 to select various functions, control, and interact with the wireless device 115. The processor 220 may be further coupled to a memory 208, configured for storing data, instructions, or any other suitable arrangement of information used by the wireless device 115. The various components the wireless device 115 may be in communication with some or all of the other components of the wireless device 115 via one or more busses 217, for example.

The processor 220 may be embodied by any suitable processor capable of performing the functions described herein. Examples of processors 220 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 220, as utilized in an apparatus such as the wireless device 115, may be used to implement any one or more of the processes described below and illustrated in FIGS. 4-6.

In this example, the wireless device 115 may be implemented with a bus architecture, represented generally by the bus 217. The bus 217 may include any number of interconnecting busses and bridges depending on the specific application of the wireless device 115 and the overall design constraints. The bus 217 links together various circuits including one or more processors (represented generally by the processor 220) and a memory 208, which may include computer-readable media (represented generally by the computer-readable medium 206). The bus 217 may also link various other circuits such as timing sources, peripherals, voltage regulators, and power management circuits, which are well known in the art, and therefore, will not be described any further.

Depending upon the nature of the apparatus, a user interface 225 (e.g., keypad, display, speaker, microphone, joystick) may also be provided.

In an aspect of the disclosure, the processor 220 may include one or more functional circuits, modules, or blocks. For example, the processor 220 may include a channel characteristic determination circuit 222. For example, the channel characteristic determination circuit 222 may be configured to control one or more receive circuits 240a-n to measure one or more characteristics of a radio channel, including but not limited to generating an automatic gain control (AGC) value. The processor 220 may further include an initial system acquisition performance circuit 224. For example, the initial system acquisition performance circuit 224 may be configured to perform an initial system acquisition utilizing a chosen receive circuit/antenna combination as controlled, for example, by the switching circuitry 260. The processor 220 may further include a threshold comparison circuit 226. For example, the threshold comparison circuit 226 may be configured to enable the wireless device 115 to determine whether a determined channel characteristic, such as an AGC value, is greater than a certain threshold. In some examples, the threshold may be a predetermined value, and in other examples, the threshold may be determined according to any suitable parameters or factors. Further, in some examples, two or more thresholds may be utilized by the threshold comparison circuit 226, and the threshold value(s) may be stored in memory 208. The processor 220 may further include an antenna switching and receive diversity implementation circuit 228. For example, the antenna switching and receive diversity implementation circuit 228 may be configured to control the switching circuitry 260 to toggle or switch connections between transmit circuits and/or receive circuits, and antennas. Further, the antenna switching and receive diversity implementation circuit 228 may be configured to control which one or more receive circuits 240a-n are to be utilized for an initial system acquisition attempt.

The processor 220 is responsible for managing the bus 217 and general processing, including the execution of software stored on the computer-readable medium 206. The software, when executed by the processor 220, causes the wireless device 115 to perform the various functions described below for any particular apparatus. The computer-readable medium 206 may also be used for storing data that is manipulated by the processor 220 when executing software.

One or more processors 220 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the wireless device 115, external to the wireless device 115, or distributed across multiple entities including the wireless device 115. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The switching circuitry 260 may be provided to allow the processor 220 to select antennas 270a-n from which transmit circuits 230a-n or receive circuits 240a-n are configured to transmit and receive. The switching circuitry 260 may include circuitry configured to switch M inputs corresponding to the transmit circuits 230a-n and receive circuits 240a-n to N outputs corresponding to antennas 270a-n. As shown in FIG. 2, there may be more or less than three transmit circuits 230a-n, three receive circuits 240a-n, and three antennas 270a-n. As one example, the switching circuitry 260 may be configured as a crossbar switch or other suitable switching circuitry. The processor 220 may be configured to switch transmit circuits 230a-n and receive circuits 240a-n to respectively transmit and receive via any combination of antennas 270a-n. The specific mapping of antennas to transmit and/or receive circuits may in some examples be controlled by the processor 220, or in other examples, may be controlled by any other suitable entity, including but not limited to the switching circuitry itself, the transmitters and/or receivers, the antennas, etc.

Figure 3:
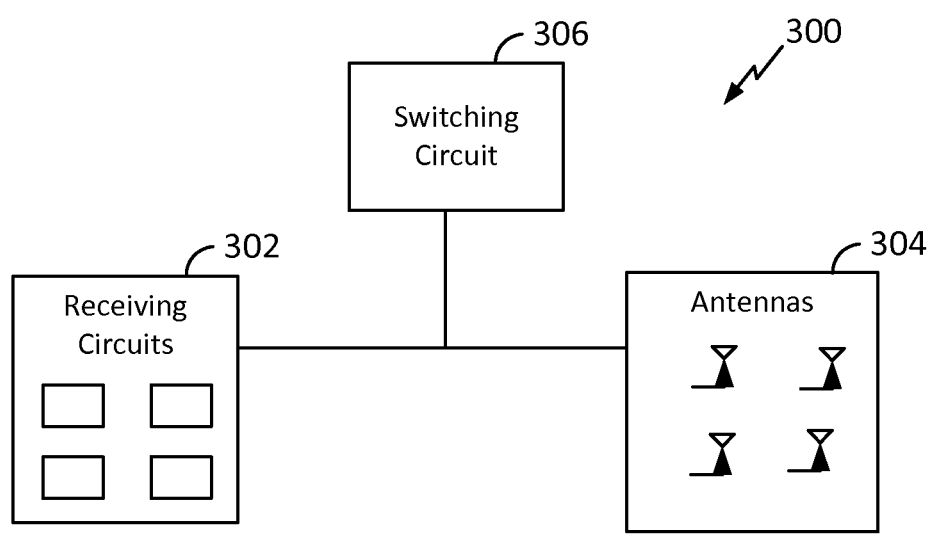
FIG. 3 is a simplified block diagram of part of a wireless device configured for antenna switching in accordance with some aspects of the disclosure.

FIG. 3 is a simplified block diagram of another exemplary wireless device 300 that may be employed within the wireless communication system 100 in accordance with some aspects of the disclosure. Those skilled in the art will appreciate that a wireless device 300 may have more components, such as any one or more of the components shown in FIG. 2. The wireless device 300 shown includes only those components useful for describing some prominent features of certain examples. The wireless device 300 includes receiving circuits 302. In some cases, a means for receiving may include one of the receiving circuits 302. The device 300 further includes a plurality of antennas 304. The device 300 further includes a switching circuit 306. The switching circuit 306 may be configured to perform one or more of the functions described above with respect to FIGS. 4-6. In some cases, a means for switching may include the switching circuit 306. The switching circuit 306 may be a processor 220 and may include switching circuitry 260.

Various aspects of the disclosed approach may be implemented with the components illustrated in FIGS. 1-3. Indeed, aspects of the disclosed approach may be implemented within and positioned within wireless communication devices such as those discussed above. Also, aspects of the disclosed approach may include circuits and components capable of carrying out the described algorithms in the flow charts described herein as well as the below discussed actions.

In various aspects of the disclosed approach, as will be described in more detail below, each of the receive circuits 240a-n (and/or the receive circuits 302) may be enabled and disabled under certain conditions to reduce overall power consumption and/or to improve acquisition performance of the wireless device 115. Moreover, in various aspects of the disclosed approach, as will be described in more detail below, the coupling between a particular receive circuit and a particular antenna may be toggled, switched, or reconnected under certain conditions to reduce overall power consumption and/or to improve acquisition performance of the wireless device 115.

In the present disclosure, initial system acquisition, initial channel acquisition, and initial acquisition are terms that may be used interchangeably to refer generally to a process of initially establishing and acquiring a channel for communication with a wireless communication network. For example, the initial acquisition may occur when the wireless device initially powers on, or when the wireless device returns after going out of service. This is generally to be distinguished from re-acquisition, wherein a wireless device re-acquires an already-established channel, as is performed, for example, by devices utilizing discontinuous reception (DRX) or slotted mode operation. In DRX, a device in an idle mode may periodically shut off certain portions of its RF circuitry to save power, powering on and re-acquiring the channel to listen, for example, for incoming page messages at known intervals.

For many conventional wireless devices, when the device initially powers up, or when returning after going out of service, only one receive circuit is typically used to try to acquire a system and establish communication with the cellular network. However, in wireless devices having more than one receive circuit and configured to enable MRD, if each of the receive chains is utilized to attempt to acquire the system, the probability of acquisition can be increased.

However, there are certain costs to using MRD for acquisition, such as increased power consumption (using an additional receive circuit), as well as possible increased latency in the acquisition, in some implementations.

Moreover, any improvements in initial acquisition that might otherwise arise from the implementation of MRD can be hindered based on certain conditions such as the so-called "death grip" (where one of the antennas is shorted or blocked by the position of the user's hand); or where one or more of the antennas is located in a deep fade; or any other conditions that might cause the performance of one or more of the antennas to degrade.

Still further, it may be the case that the wireless device is not capable of utilizing one or more of its receivers for an initial acquisition attempt, for example because that receiver may already be in use by some other technology. That is, some wireless devices have the capability to utilize two or more radio access technologies (RATs) at the same time, and the initial acquisition that may occur for one RAT may coincide with some other ongoing communication activity utilizing another RAT.

Thus, according to some aspects of the present disclosure, the switching circuitry (e.g., switching circuitry 260 or 306) may be utilized in addition to or instead of MRD during initial acquisition, enabling the best antenna for acquisition to be chosen for a receive circuit to utilize.

As described in further detail below, two exemplary processes are described and illustrated as detailed examples of algorithms for initial system acquisition as may be implemented by the wireless device 115 illustrated in FIG. 2, or by the apparatus 300 illustrated in FIG. 3. In these exemplary processes, antenna switching refers generally to the process of selecting a pairing of a particular antenna to a particular receive circuit, or mapping a set of antennas to a set of receive circuits.

Figure 4:
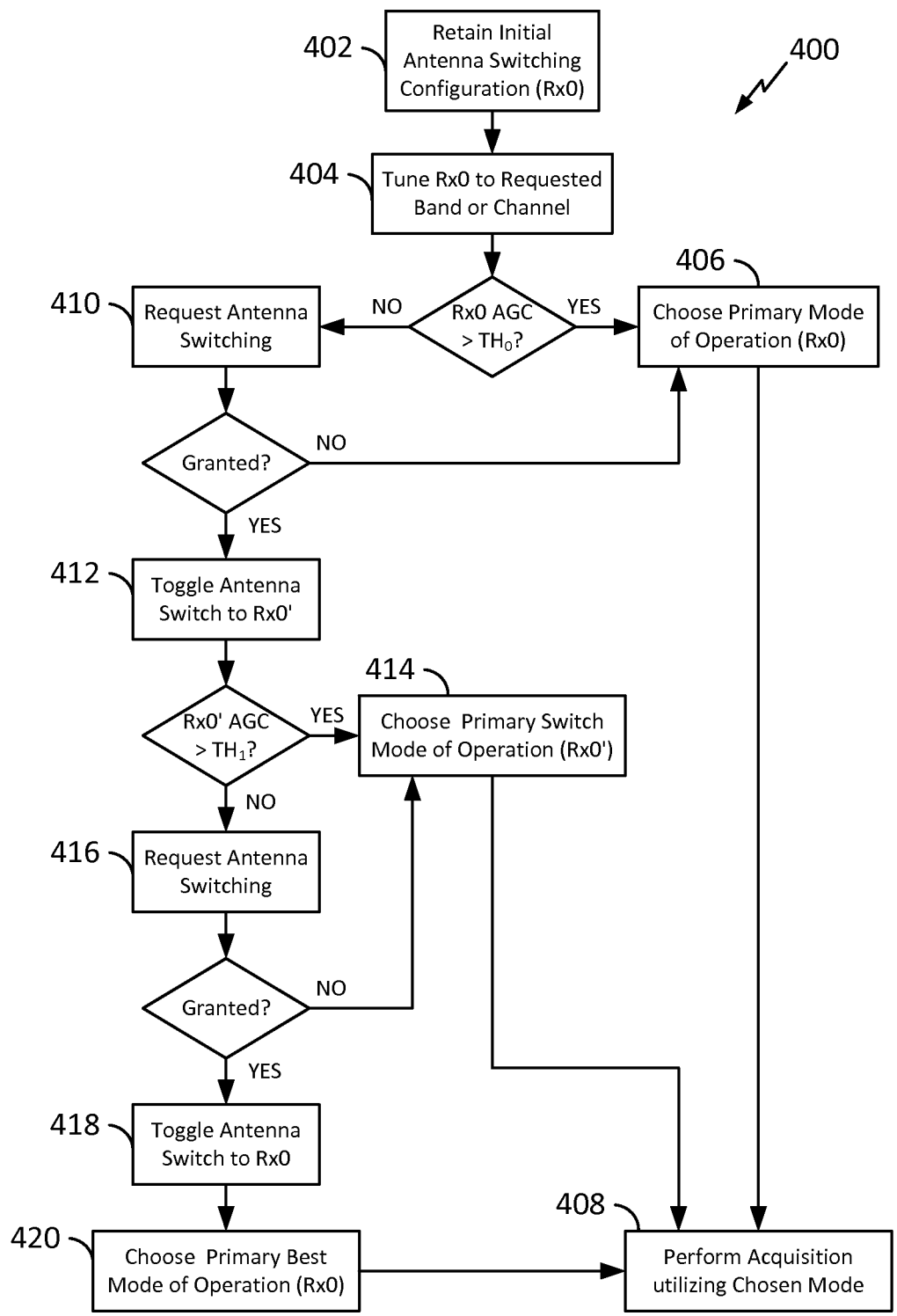
FIG. 4 is a flow chart illustrating an exemplary process for selectively switching antennas during initial acquisition.

FIG. 4 is a flow chart illustrating an exemplary process 400 for initial system acquisition utilizing antenna switching in accordance with one or more aspects of the present disclosure. In various examples, the illustrated process 400 may be carried out by the wireless device 115 or the apparatus 300. In some examples, the process 400 may be carried out by the processor 220, which may implement instructions on a computer-readable medium 206. On some examples, the process 400 may be carried out by any suitable apparatus or means for performing the described functions.

The process 400 generally describes an algorithm utilizing antenna switching to select a combination of antenna and receive circuit to utilize for initial system acquisition, without utilizing receive diversity during the initial acquisition. That is, as described below, in accordance with suitable factors, the wireless device may determine which single antenna to pair with which single receive circuit for the initial acquisition.

At 402, the wireless device 115 may retain its initial antenna switching configuration, which may be designated herein as Rx0, and may be described as a "primary mode" of operation. That is, prior to the beginning of the process 400, switching circuitry 260 may have some initial or prior configuration, e.g., a configuration established during a prior wake-up or a prior communication session, which the switching circuitry 260 may have retained. As one non-limiting example, a first receive circuit 240*a* may be coupled with a first antenna 270*a*, and a second receive circuit 240*b* may be coupled with a second antenna 270*b*. Of course, any other suitable mapping between receive circuits and antennas may be utilized in various examples. Thus, at 402, this existing configuration Rx0 may be retained.

At 404, the wireless device 115 may tune the first receive circuit, configured according to the configuration Rx0, to a requested band or channel. That is, the first receive circuit (e.g., receive circuit 240*a*) may be configured, e.g., by the processor 220, to receive transmissions on a selected band or channel on which the wireless device 115 may wish to acquire service. Here, by tuning the receive circuit to the requested band or channel, the receive circuit may be enabled to measure one or more characteristics of the requested band or channel, including but not limited to a received signal code power (RSCP), a pilot power, a signal to noise ratio, or any other suitable characteristic or parameter of the requested band or channel.

In one particular example, the receive circuit may be configured to generate an automatic gain control (AGC) value corresponding to a received signal power, and to compare this AGC value with a suitable threshold (e.g., a predetermined threshold TH0). For example, the wireless device 115 may determine whether Rx0_Rx_AGC>TH0.

Here, in the case that the generated AGC value is greater than TH0, then the process may proceed to 406, wherein the wireless device 115 may choose the configuration Rx0 as the selected mode of operation for the initial system acquisition. That is, because the AGC value is determined to be greater than the threshold TH0, then the configuration Rx0, wherein the first receive circuit 240*a* is coupled by the switching circuit 260 to the first antenna 270*a*, may be utilized for the initial system acquisition. That is, with this configuration, the first receive circuit 240*a*, coupled with the first antenna 270*a*, may be utilized at 408 to perform initial system acquisition.

On the other hand, if the AGC value determined after tuning Rx0 to the requested band or channel at 404 is not greater than the threshold TH0, then the process 400 may proceed to 410, wherein the wireless device 115 may request antenna switching. For example, the switching circuitry 260 may request to the processor 220, or to any other suitable controlling entity, for permission to switch its configuration to couple the first receive circuit with a different antenna, for example the second antenna 270*b*. Here, requesting permission to implement antenna switching, as at 410, may be utilized to ensure that ongoing communications utilizing another transmit or receive circuit and a particular antenna are not interrupted.

If the request for antenna switching is not granted, then the process may return to 406, wherein the primary mode of operation (Rx0) may continue to be utilized to perform initial system acquisition. However, if the request for antenna switching is granted, then the process may proceed to 412, wherein the switching circuitry 260 may toggle to a "primary switch" mode of operation, which may be referred to herein as Rx0'. Here, the primary switch mode Rx0' refers to a configuration where the same receive circuit from the primary mode of operation Rx0 is still utilized, but the switching circuitry 260 switches or toggles its coupling to a different antenna, for example, the second antenna 270b.

Once the wireless device 115 is reconfigured according to the primary switch mode of operation Rx0', the wireless device 115 may again measure one or more characteristics of the requested band or channel. For example, the receive circuit may generate an AGC value corresponding to a received signal power, and to compare this AGC value with a suitable threshold (e.g., a predetermined threshold TH1). For example, the wireless device 115 may determine whether Rx0'_Rx_AGC>TH1.

Here, in the case that the AGC value is greater than TH1, then the process may proceed to 414, wherein the wireless device 115 may choose the primary switch (Rx0') mode of operation, and proceed to 408, wherein the wireless device 115 may perform the initial system acquisition utilizing the chosen primary switch mode of operation. That is, if it is determined that the primary switch mode of operation, utilizing the second antenna 270b results in adequate signal quality, then this mode may be utilized for the initial system acquisition.

On the other hand, if the AGC value determined utilizing the primary switch Rx0' mode of operation is not greater than the threshold TH1, then the process may proceed to 416, wherein the wireless device 115 may request antenna switching. Again, here, the switching circuitry 260 may request to the processor 220, or to any other suitable controlling entity, for permission to switch its configuration to couple the first receive circuit back to the primary mode of operation. If the request for antenna switching is not granted, then the process may return to 414, wherein the wireless device 115 may select the primary switch mode of operation Rx0' and at 408 the wireless device 115 may perform the initial system acquisition utilizing the chosen mode of operation.

In another scenario, if the request for antenna switching is granted, then the process may proceed to 418, wherein the switching circuitry 260 may toggle back to the primary mode of operation Rx0, wherein the first antenna 270a is coupled to the first receive circuit 240a. Here, because the initial configuration was not greater than the first threshold TH0, but the second (switched) configuration was not greater than the second threshold TH1, the "return" mode of operation may be referred to as a primary best mode of operation, or Rx0.

Thus, as in the described example, antenna switching may be utilized to select from among two antennas for a receive circuit to utilize for initial system acquisition, in accordance with an AGC value measured utilizing each of the candidate antennas. Furthermore, as described, the switching of the antenna may be contingent upon the grant of permission for use of a particular antenna, which may in some examples correspond to whether that antenna is in use by another technology or RAT.

In this example, as in various aspects of the disclosure, the configuration utilized for initial system acquisition may be retained when exiting the initial acquisition phase. For example, the selected configuration may be utilized for data communication, for later re-acquisition, and/or for a subsequent initial acquisition after the wireless device 115 goes out of service. Of course, this is merely one option within the scope of the disclosure, and in other examples, the configuration may be changed, reset to another initial configuration, etc.

Figure 5:
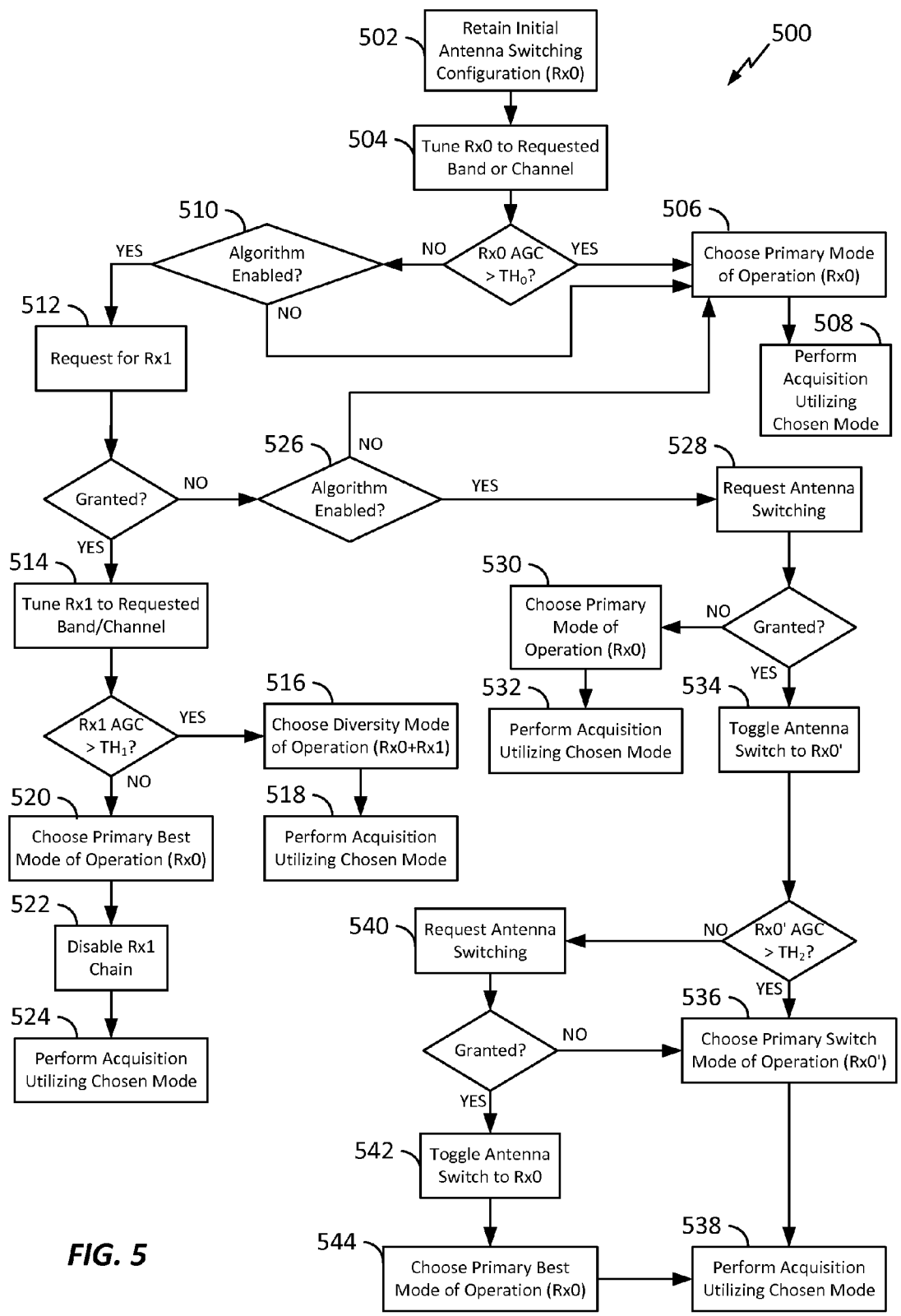
FIG. 5 is a flow chart illustrating another exemplary process for selectively switching antennas and/or invoking MRD during initial acquisition.

FIG. 5 is a flow chart illustrating an exemplary process 500 for initial system acquisition utilizing antenna switching with the possibility of receive diversity in accordance with one or more aspects of the present disclosure. In various examples, the illustrated process 500 may be carried out by the wireless device 115 or the apparatus 300. In some examples, the process 500 may be carried out by the processor 220, which may implement instructions on a computer-readable medium 206. On some examples, the process 500 may be carried out by any suitable apparatus or means for performing the described functions.

The process 500 generally describes an algorithm utilizing antenna switching to select a combination of antenna(s) and receive circuit(s) to utilize for initial system acquisition, with the possibility of selecting to use receive diversity during the initial acquisition. That is, as described below, in accordance with suitable factors, the wireless device may determine which antenna(s) to couple with which receive circuit(s) for the initial acquisition.

At 502, the wireless device 115 may retain its initial antenna switching configuration, which may be designated herein as Rx0, and may be described as a "primary mode" of operation. That is, prior to the beginning of the process 500, switching circuitry 260 may have some initial or prior configuration, e.g., a configuration established during a prior wake-up or a prior communication session, which the switching circuitry 260 may have retained. As one non-limiting example, a first receive circuit 240a may be coupled with a first antenna 270a, and a second receive circuit 240b may be coupled with a second antenna 270b. Of course, any other suitable mapping between receive circuits and antennas may be utilized in various examples. Thus, at 502, this existing configuration Rx0 may be retained.

At 504, the wireless device 115 may tune the first receive circuit, configured according to the configuration Rx0, to a requested band or channel. That is, the first receive circuit (e.g., receive circuit 240a) may be configured, e.g., by the processor 220, to receive transmissions on a selected band or channel on which the wireless device 115 may wish to acquire service. Here, by tuning the receive circuit to the requested band or channel, the receive circuit may be enabled to measure one or more characteristics of the requested band or channel, including but not limited to a received signal code power (RSCP), a pilot power, a signal to noise ratio, or any other suitable characteristic or parameter of the requested band or channel.

In one particular example, the receive circuit may be configured to generate an automatic gain control (AGC) value corresponding to a received signal power, and to compare this AGC value with a suitable threshold (e.g., a predetermined threshold TH0). For example, the wireless device 115 may determine whether Rx0_Rx_AGC>Th0.

Here, in the case that the generated AGC value is greater than TH0, then the process may proceed to 506, wherein the wireless device 115 may choose the configuration Rx0 as the selected mode of operation for the initial system acquisition. That is, because the AGC value is determined to be greater than the threshold TH0, then the configuration Rx0, wherein the first receive circuit 240a is coupled by the switching circuit 260 to the first antenna 270a, may be utilized for the initial system acquisition. That is, with this configuration, the first receive circuit 240a, coupled with the first antenna 270a, may be utilized at 508 to perform initial system acquisition.

On the other hand, if the AGC value determined after tuning Rx0 to the requested band or channel at 504 is not greater than the threshold TH0, then the process 500 may proceed to 510, wherein the wireless device 115 may determine whether the antenna switching algorithm disclosed herein is enabled, e.g., for utilization of receive diversity for initial system acquisition. For example, in one aspect of the disclosure, the memory 208 at the wireless device 115 may include a suitable mask of bits, wherein each of the bits in the mask may represent whether all or a portion of the antenna switching algorithm (e.g., an algorithm to enable utilization of receive diversity for initial system acquisition) is enabled. Of course, this is merely one example, and any suitable algorithm for determining whether the antenna switching algorithm is enabled may be utilized within the present disclosure. In other examples, 510 may be skipped, and the algorithm may be enabled in all cases. Here, if at 510 the wireless device 115 determines that the algorithm is not enabled, then the process may return to block 506, wherein the primary mode of operation (Rx0) may be selected, and at 508, the wireless device 115 may perform the initial system acquisition utilizing the chosen Rx0 mode of operation.

On the other hand, if the algorithm is enabled, then the process may proceed to 512, wherein the wireless device 115 may request use of a secondary mode of operation (Rx1), utilizing a second receive circuit (e.g., second receive circuit 240b). For example, the switching circuitry 260 may request to the processor 220, or to any other suitable controlling entity, for permission to switch its configuration to couple the second receive circuit with any suitable antenna, for example the second antenna 270b, and to utilize this configuration for an initial system acquisition attempt.

If the request to utilize the secondary mode of operation Rx1 is granted, then the process may proceed to 514, wherein the switching circuitry 260 may implement the selected configuration, and tune the second receiver 240b and its coupled antenna to the requested band or channel and once again begin to measure one or more characteristics of the requested band or channel. For example, the receive circuit may generate an AGC value corresponding to a received signal power, and compare this AGC value with a suitable threshold (e.g., a predetermined threshold TH1). For example, the wireless device 115 may determine whether Rx1_Rx_AGC>TH1.

Here, in the case that the AGC value is greater than TH1, then the process may proceed to 516, wherein the wireless device 115 may select a diversity mode of operation, utilizing the Rx0 configuration (in the above-described example, the first receive circuit 240a and the first antenna 270a) concurrently with the Rx1 configuration (in the above-described example, the second receive circuit 240b and the second antenna 270b). Thus, at 518, the wireless device 115 may perform the initial system acquisition utilizing the chosen diversity mode of operation (Rx0+Rx1).

That is, as described above, in the case that the Rx0 mode of operation is not good enough individually (e.g., its detected AGC value is less than a first threshold, or Rx0_Rx_AGC≤TH0), but the Rx1 mode of operation results in a detected AGC value greater than a second threshold (e.g., its detected AGC value is greater than a second threshold, or Rx0_Rx_AGC>TH1), then receive diversity that combines Rx0 and Rx1 together may be utilized for the initial system acquisition.

On the other hand, if the detected AGC utilizing the secondary mode of operation Rx1 is not greater than the second threshold TH1, then the process may proceed to 520, wherein the wireless device 115 may interpret this condition as indicative that receive diversity would not sufficiently assist in the initial system acquisition. Thus, the wireless device 115 may choose the primary best mode of operation Rx0, electing to revert to single-antenna acquisition utilizing the first receive circuit 240a and the first antenna 270a. Thus, at 522, the wireless device 115 may disable the second receive circuit 240b corresponding to the secondary mode of operation Rx1, and at 524, the wireless device 115 may perform the initial system acquisition utilizing the chosen primary best mode of operation Rx0.

Returning to 512, wherein the wireless device 115 requested secondary mode of operation Rx1. Here, if the request is denied, then the process may proceed to 526, wherein the wireless device 115 may determine whether the antenna switching algorithm described herein is enabled, e.g., for switching to a primary switch mode of operation Rx0' for initial system acquisition. For example, in one aspect of the disclosure, the memory 208 at the wireless device 115 may include a suitable mask of bits, wherein each of the bits in the mask may represent whether all or a portion of the antenna switching algorithm (e.g., an algorithm to enable utilization of the primary switch mode of operation Rx0' for initial system acquisition) is enabled. Of course, this is merely one example, and any suitable algorithm for determining whether the antenna switching algorithm may be utilized within the present disclosure. In other examples, 526 may be skipped, and the algorithm may be enabled in all cases. Here, if at 526 the wireless device 115 determines that the algorithm is not enabled, then the process may return to block 506, wherein the primary mode of operation Rx0 may be selected, and at 508, the wireless device 115 may perform the initial system acquisition utilizing the chosen Rx0 mode of operation.

On the other hand, if the algorithm is enabled, then the process may proceed to 528, wherein the wireless device 115 may request antenna switching, e.g., the use of the primary switch Rx0' mode of operation. For example, the switching circuitry 260 may request to the processor 220, or to any other suitable controlling entity, for permission to switch its configuration to couple the first receive circuit with any suitable antenna, for example the second antenna 270b, and to utilize this configuration for an initial acquisition attempt.

If the request to utilize the primary switch Rx0' mode of operation is not granted, then the process may proceed to 530, wherein the wireless device 115 may choose the configuration Rx0 as the selected mode of operation for the initial system acquisition, and at 532, the wireless device 115 may perform the initial system acquisition utilizing the chosen primary mode of operation Rx0.

On the other hand, if antenna switching to utilize the primary switch Rx0' mode of operation is granted, then the process may proceed to 534, wherein the switching circuitry 260 may toggle to the primary switch Rx0' mode of operation, described above. Once the wireless device 115 is reconfigured according to the primary switch Rx0' mode of operation, the wireless device 115 may again measure one or more characteristics of the requested band or channel. For example, the receive circuit may generate an AGC value corresponding to a received signal power, and compare this AGC value with a suitable threshold (e.g., a predetermined threshold TH2). For example, the wireless device 115 may determine whether Rx0'_Rx_AGC>TH2).

Here, in the case that the AGC value is greater than TH2, then the process may proceed to 536, wherein the wireless device 115 may choose the primary switch (Rx0') mode of operation, and proceed to 538, wherein the wireless device 115 may perform the initial system acquisition utilizing the chosen primary switch mode of operation. That is, if it is determined that the primary switch mode of operation, utilizing the second antenna 270b results in adequate signal quality, then this mode may be utilized for the initial system acquisition.

On the other hand, if the AGC value determined utilizing the primary switch Rx0' mode of operation is not greater than the threshold TH2, then the process may proceed to 540, wherein the wireless device 115 may request antenna switching. Again, here, the switching circuitry 260 may request to the processor 220, or to any other suitable controlling entity, for permission to switch its configuration to couple the first receive circuit back to the primary mode of operation. If the request for antenna switching is not granted then the process may return to 536, wherein the wireless device 115 may select the primary switch mode of operation Rx0' and at 538 the wireless device 538 may perform the initial system acquisition utilizing the chosen mode of operation.

On the other hand, if the request for antenna switching is granted, then the process may proceed to 542, wherein the switching circuitry 260 may toggle back to the primary mode of operation Rx0, wherein the first antenna 270 is coupled to the first receive circuit 240a. Here, because the primary switch mode of operation Rx0' was not greater than the second threshold TH1, then, even though the primary mode of operation Rx0 was less than the first threshold TH0, the primary mode of operation Rx0 may nevertheless be utilized for the performance of the initial system acquisition.

In this example, as in various aspects of the disclosure, the configuration utilized for initial system acquisition may be retained when exiting the initial acquisition phase. For example, the selected configuration may be utilized for data communication, for later re-acquisition, and/or for a subsequent initial acquisition after the wireless device 115 goes out of service. Of course, this is merely one option within the scope of the disclosure, and in other examples, the configuration may be changed, reset to another initial configuration, etc.

Figure 6:
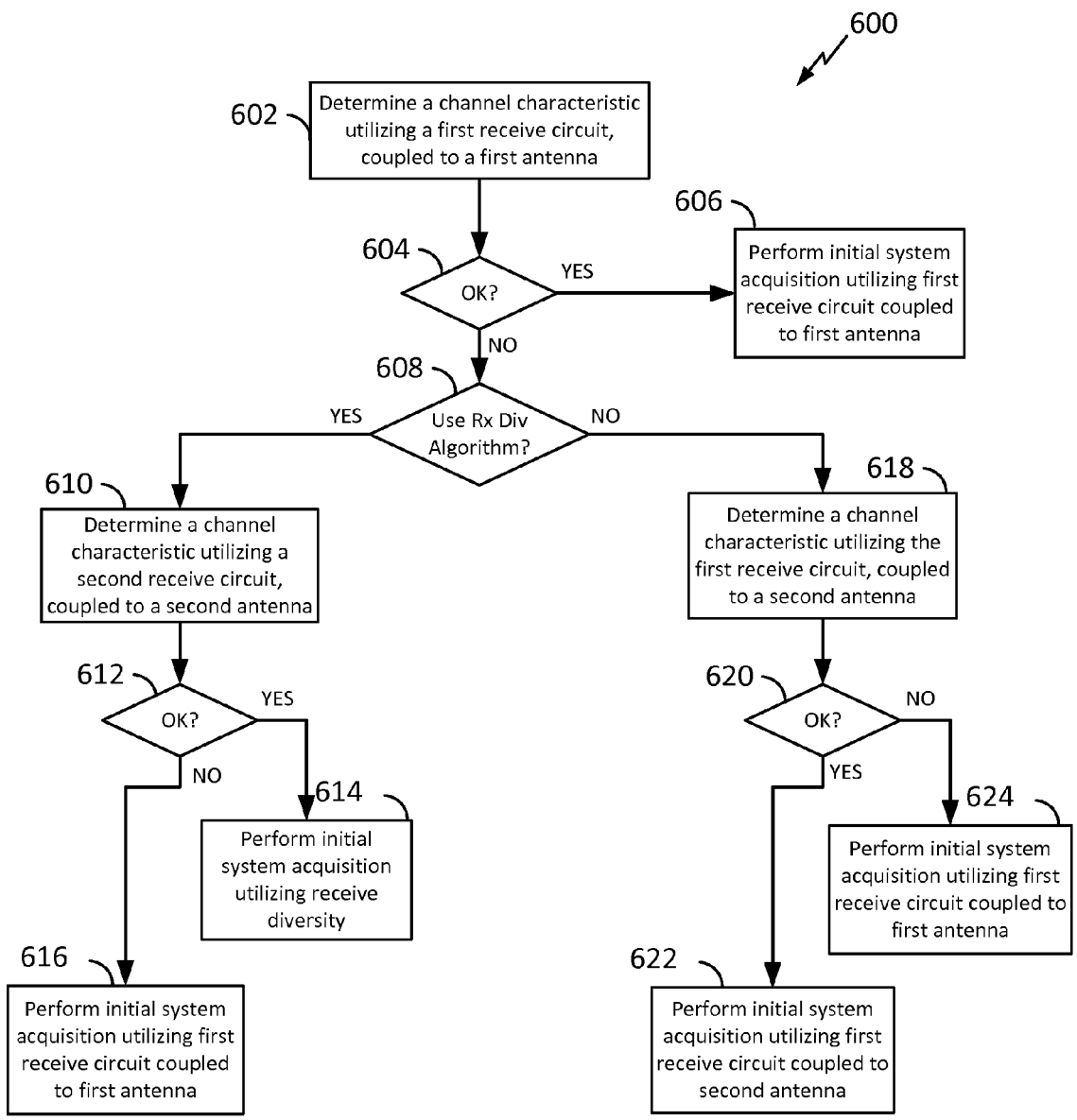
FIG. 6 is a flow chart illustrating another exemplary process for selectively switching antennas and/or invoking MRD during initial acquisition.

FIG. 6 is a flow chart illustrating another exemplary process 600 in accordance with one or more aspects of the disclosure. In various examples, the illustrated process 600 may be carried out by the wireless device 115 or the apparatus 300. In some examples, the process 500 may be carried out by the processor 220, which may implement instructions on a computer-readable medium 206. On some examples, the process 500 may be carried out by any suitable apparatus or means for performing the described functions.

At 602, the wireless device may determine a first channel characteristic, utilizing a first antenna coupled to a first receive circuit, and at 604, the wireless device may determine if the determined first channel characteristic is sufficient. For example, in an example wherein the first channel characteristic is an AGC value, then at 604 the wireless device may determine whether the AGC value is greater than a suitable first threshold value.

If the first channel characteristic is sufficient, then the process may proceed to 606, wherein the wireless device may perform an initial system acquisition attempt utilizing the first receive circuit coupled to the first antenna.

On the other hand, if the first channel characteristic is not sufficient, then the process may proceed to 608. Here, the wireless device may determine whether a receive diversity determination algorithm is to be utilized. That is, the wireless device may or may not choose whether receive diversity is to be attempted for initial system acquisition. That is, in a particular example, such a receive diversity selection algorithm may not be implemented; or, in another example, a second receive circuit may be unavailable, e.g., being currently in use by some other radio access technology.

If a receive diversity determination algorithm is to be used, then the process may proceed to 610, wherein the wireless device may determine a second channel characteristic utilizing a second receive circuit coupled to a second antenna, and at 612, the wireless device may determine if the determined first channel characteristic is sufficient. Here, again, in an example wherein the second channel characteristic is an AGC value, then at 612 the wireless device may determine whether the AGC value is greater than a suitable second threshold value.

If the second channel characteristic is sufficient, then the process may proceed to 614, wherein the wireless device may perform an initial system acquisition attempt utilizing receive diversity, combining the performance of the first antenna coupled to the first receive circuit, with the performance of the second antenna coupled to the second receive circuit.

On the other hand, if the second channel characteristic is not sufficient, then the process may proceed to 616. Here, the wireless device may perform the initial system acquisition utilizing the first antenna coupled to the first antenna, only. That is, if the second receive circuit and second antenna are determined to provide insufficient help, then receive diversity is not utilized and single-antenna acquisition may be utilized.

Returning to 608, if the receive diversity determination algorithm is not utilized, then the process may move on to perform an antenna switching determination algorithm. That is, at 618, the wireless device may determine a third channel characteristic utilizing the first receive circuit, coupled to a second antenna. For example, antenna switching circuitry may toggle the first receive circuit to instead couple it with the second antenna.

At 620, the wireless device may determine if the determined third channel characteristic is sufficient. For example, in an example wherein the third channel characteristic is an AGC value, then at 620 the wireless device may determine whether the AGC value is greater than a suitable third threshold value.

If the third channel characteristic is sufficient, then the process may proceed to 622, wherein the wireless device may perform an initial system acquisition attempt utilizing the first receive circuit coupled to the second antenna. On the other hand, if the third channel characteristic is not sufficient, then the process may proceed to 624. That is, the wireless may revert to the initial configuration, e.g., by toggling the switching circuitry to couple the first receive circuit to the first antenna, and performing the initial system acquisition utilizing this configuration.

In this way, utilizing the above-described aspects of the disclosure, the probability of success of an initial system acquisition attempt can be improved relative to another algorithm that utilizes a single receiver, and/or a single antenna. Moreover, battery power at the wireless device can be conserved relative to a device that always implements receive diversity for initial system acquisition.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. That is, one or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, and functions may be shown in block diagram form in order not to obscure the disclosed approach in unnecessary detail. Conversely, specific implementations shown and described are exemplary only and should not be construed as the only way to implement the disclosed approach unless specified otherwise herein. Additionally, block definitions and partitioning of logic between various blocks is exemplary of a specific implementation. It is readily apparent to one of ordinary skill in the art that the disclosed approach may be practiced by numerous other partitioning solutions. For the most part, details concerning timing considerations and the like have been omitted where such details are not necessary to obtain a complete understanding of the disclosed approach and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosed approach may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of initial system acquisition operable at a multi-antenna wireless communication device, the method comprising:
   if a first channel characteristic, detected utilizing a first antenna coupled to a first receive circuit, is greater than a first threshold value, performing initial system acquisition utilizing the first antenna coupled to the first receive circuit;
   if the first channel characteristic is not greater than the first threshold value, toggling an antenna switching circuit to couple the first receive circuit to a second antenna; and
   if a second channel characteristic, detected utilizing the second antenna coupled to the first receive circuit, is greater than a second threshold value, performing initial system acquisition utilizing the second antenna coupled to the first receive circuit.

2. The method of claim 1, further comprising:
   if the second channel characteristic is not greater than the second threshold value, toggling the antenna switching circuit to couple the first receive circuit to the first antenna, and performing initial system acquisition utilizing the first antenna coupled to the first receive circuit.

3. The method of claim 1, wherein the first channel characteristic comprises an automatic gain control (AGC) value corresponding to a received signal energy utilizing the first antenna coupled to the first receive circuit; and wherein the second channel characteristic comprises an AGC value corresponding to a received signal energy utilizing the second antenna coupled to the first receive circuit.

4. A method of initial system acquisition operable at a multi-antenna wireless communication device, the method comprising:

if a first channel characteristic detected utilizing a first antenna coupled to a first receive circuit is greater than a first threshold value, performing initial system acquisition utilizing the first antenna coupled to the first receive circuit; and if the first channel characteristic is not greater than the first threshold value, selecting one of a receive diversity determination algorithm, or an antenna switching determining algorithm, for determining an antenna configuration for initial system acquisition.

5. The method of claim 4, wherein the first channel characteristic comprises an automatic gain control (AGC) value corresponding to a received signal energy utilizing the first antenna coupled to the first receive circuit.

6. The method of claim 4, wherein the selecting one of a receive diversity determination algorithm, or an antenna switching determining algorithm, comprises selecting the receive diversity determination algorithm, the method further comprising:

if a second channel characteristic detected utilizing a second antenna coupled to a second receive circuit is greater than a second threshold value, performing initial system acquisition utilizing receive diversity, combining performance of the first antenna coupled to the first receive circuit with performance of the second antenna coupled to the second receive circuit.

7. The method of claim 6, wherein the second channel characteristic comprises an automatic gain control (AGC) value corresponding to a received signal energy utilizing the second antenna coupled to the second receive circuit.

8. The method of claim 4, wherein the selecting one of a receive diversity determination algorithm, or an antenna switching determining algorithm, comprises selecting the antenna switching determination algorithm, the method further comprising:

toggling an antenna switching circuit to couple the first receive circuit to a second antenna; and if a second channel characteristic detected utilizing the second antenna coupled to the first receive circuit is greater than a second threshold value, performing initial system acquisition utilizing the second antenna coupled to the first receive circuit.

9. The method of claim 8, wherein the second channel characteristic comprises an automatic gain control (AGC) value corresponding to a received signal energy utilizing the second antenna coupled to the first receive circuit.

10. The method of claim 8, further comprising:

if the second channel characteristic is not greater than the second threshold value, toggling the antenna switching circuit to couple the first receive circuit to the first antenna, and performing initial system acquisition utilizing the first antenna coupled to the first receive circuit.

11. A wireless communication device, comprising:
at least one processor;
a memory communicatively coupled to the at least one processor;
a plurality of receive circuits communicatively coupled to the at least one processor;
a plurality of antennas; and
an antenna switching circuit communicatively coupled to the at least one processor for controlling a coupling between respective ones of the plurality of antennas and respective ones of the plurality of receive circuits,
wherein the at least one processor is configured to:
perform initial system acquisition utilizing a first antenna of the plurality of antennas coupled to a first receive circuit of the plurality of receive circuits if a first channel characteristic, detected utilizing the first antenna coupled to the first receive circuit, is greater than a first threshold value;
toggle the antenna switching circuit to couple the first receive circuit to a second antenna of the plurality of antennas if the first channel characteristic is not greater than the first threshold value; and
perform initial system acquisition utilizing the second antenna coupled to the first receive circuit if a second channel characteristic, detected utilizing the second antenna coupled to the first receive circuit, is greater than a second threshold value.

12. The wireless communication device of claim 11, wherein the at least one processor is further configured to:
toggle the antenna switching circuit to couple the first receive circuit to the first antenna, and perform initial system acquisition utilizing the first antenna coupled to the first receive circuit if the second channel characteristic is not greater than the second threshold value.

13. The wireless communication device of claim 11, wherein the first channel characteristic comprises an automatic gain control (AGC) value corresponding to a received signal energy utilizing the first antenna coupled to the first receive circuit; and
wherein the second channel characteristic comprises an AGC value corresponding to a received signal energy utilizing the second antenna coupled to the first receive circuit.

14. A wireless communication device, comprising:
at least one processor;
a memory communicatively coupled to the at least one processor;
a plurality of receive circuits communicatively coupled to the at least one processor;
a plurality of antennas; and
an antenna switching circuit communicatively coupled to the at least one processor for controlling a coupling between respective ones of the plurality of antennas and respective ones of the plurality of receive circuits,
wherein the at least one processor is configured to:
perform initial system acquisition utilizing a first antenna of the plurality of antennas coupled to a first receive circuit of the plurality of receive circuits if a first channel characteristic detected utilizing the first antenna coupled to the first receive circuit is greater than a first threshold value; and
select one of a receive diversity determination algorithm, or an antenna switching determining algorithm, for determining an antenna configuration for initial system acquisition if the first channel characteristic is not greater than the first threshold value.

15. The wireless communication device of claim 14, wherein the first channel characteristic comprises an automatic gain control (AGC) value corresponding to a received signal energy utilizing the first antenna coupled to the first receive circuit.

16. The wireless communication device of claim 14, wherein if the at least one processor, being configured to select one of a receive diversity determination algorithm or an antenna switching determining algorithm, selects the receive diversity determination algorithm, then the at least one processor is further configured to:

perform initial system acquisition utilizing receive diversity, combining performance of the first antenna coupled to the first receive circuit with performance of the second antenna coupled to the second receive circuit if a second channel characteristic detected utilizing a second antenna coupled to a second receive circuit is greater than a second threshold value.

17. The wireless communication device of claim 16, wherein the second channel characteristic comprises an automatic gain control (AGC) value corresponding to a received signal energy utilizing the second antenna coupled to the second receive circuit.

18. The wireless communication device of claim 14, wherein the at least one processor, being configured to select one of a receive diversity determination algorithm or an antenna switching determining algorithm, selects the antenna switching determination algorithm, then the at least one processor is further configured to:

toggle the antenna switching circuit to couple the first receive circuit to a second antenna of the plurality of antennas; and perform initial system acquisition utilizing the second antenna coupled to the first receive circuit if a second channel characteristic detected utilizing the second antenna coupled to the first receive circuit is greater than a second threshold value.

19. The wireless communication device of claim 18, wherein the second channel characteristic comprises an automatic gain control (AGC) value corresponding to a received signal energy utilizing the second antenna coupled to the first receive circuit.

20. The wireless communication device of claim 18, wherein the at least one processor is further configured to:

toggle the antenna switching circuit to couple the first receive circuit to the first antenna, and perform initial system acquisition utilizing the first antenna coupled to the first receive circuit, if the second channel characteristic is not greater than the second threshold value.

\* \* \* \* \*